United States Patent [19]

Tanigawa

[11] Patent Number: 4,972,209
[45] Date of Patent: Nov. 20, 1990

[54] IMAGE RECORDING FORMING BLANKS IN PERIPHERAL EDGES

[75] Inventor: Koichi Tanigawa, Tokyo, Japan

[73] Assignee: Canon Kabushiki Kaisha, Tokyo, Japan

[21] Appl. No.: 359,498

[22] Filed: May 31, 1989

[30] Foreign Application Priority Data

Feb. 24, 1988 [JP] Japan .................... 63-039625

[51] Int. Cl.$^5$ .................... B01D 15/16; H04N 1/21
[52] U.S. Cl. .................... 346/108; 358/296
[58] Field of Search ............ 346/108, 107 R, 76 L, 346/160; 358/296, 300, 302

[56] References Cited

U.S. PATENT DOCUMENTS 4,044,363  8/1977  Morgan .................... 346/108
4,259,008  3/1981  Yamagata .................... 355/29

Primary Examiner—Mark J. Reinhart
Attorney, Agent, or Firm—Fitzpatrick, Cella, Harper & Scinto

[57] ABSTRACT

An image recording apparatus comprises: a printer to form an image onto a recording medium; and a blank forming device to form blanks in the peripheral edge portions of the image formed on the recording medium. The blank forming device sets the blank amount in the front edge portion of the image to be smaller than the blank amount in the back edge portion or sets the blank amount of the image on the scan starting side to be smaller than the blank amount of the image on the scan end side. Even if various tolerances regarding the apparatus, copy transfer paper, conveying apparatus, and the like occur, the image is not deviated out of the paper and the toner image which is not copy transferred onto the photo sensitive drum does not remain and does not make the inside of the apparatus dirty. The effective usable region for image formation can be widened even in the two-sided mode and the multi-mode.

27 Claims, 14 Drawing Sheets

BLANK ON FIRST SURFACE (ON IMAGE SIGNAL)

BLANK ON SECOND SURFACE IN TWO-SIDED PRINT (ON IMAGE SIGNAL)

MULTI-MODE

TWO-SIDED MODE

SINGLE-SIDED MODE

MULTI-MODE
(FIRST SURFACE/
SECOND SURFACE)

TWO-SIDED MODE
(FIRST SURFACE/
SECOND SURFACE)

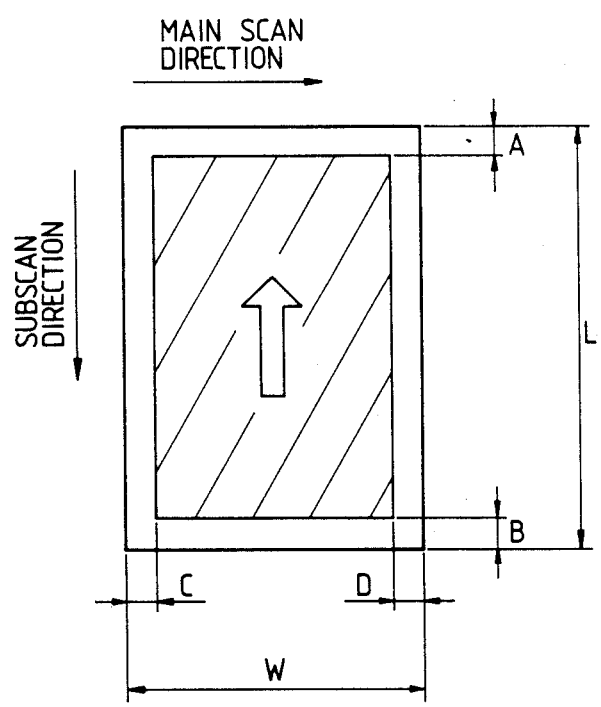

IMAGE RECORDING FORMING BLANKS IN PERIPHERAL EDGES

BACKGROUND OF THE INVENTION

1. Field of the Invention

The present invention relates to a method of making a blank in an apparatus for forming an image onto a recording medium.

2. Related Background Art

As an example of such a kind of image recording apparatus, a laser beam printer (hereinafter, abbreviated as an LBP) will be described. FIG. 16 shows an example of conventional LBP apparatuses disclosed in U.S. Pat. Nos. 4,059,833, 4,175,851, and the like. Reference numeral 1 denotes a laser driving circuit; 2 indicates a laser beam emitting device; 3 a polygonal mirror; 4 a photo sensitive drum; 5 a primary charger; 6 a developing device; 11 a copy transfer paper; 13 a conveying roller; 14 a registration roller; 15 a copy transfer charger; 16 a separating charger; 17 a cleaner; 20 a cassette; and 21 a paper feed roller.

An image signal which is given from a host computer is transmitted through the laser driving circuit 1 and actuates the laser beam emitting device 2. A laser beam emitted from the laser beam emitting device 2 scans on the surface of the photo sensitive drum 4 by an optical system (not shown) and polygonal mirror 3, so that a latent image is formed onto the drum 4. The toner is transferred onto the surface of the drum 4 in accordance with the latent image and is developed by the developing device 6. The developed image on the drum 4 is transferred onto the copy transfer paper 11 by the copy transfer charger 15. The image transferred paper 11 is then separated from the drum 4 by the separating charger 16. Thereafter, the surface of the drum 4 is cleaned by the cleaner 17 for preparation in the next use. The paper 11 is picked up from the cassette 20 by the paper feed roller 21 and is conveyed by the conveying roller 13 and is fed to the registration roller 14 section. In the inoperative mode, the registration roller 14 abuts on the front edge of the paper 11 and is driven at a proper timing when the front edge of the toner image on the drum 4 coincides with the front edge of the copy transfer paper, thereby preventing that the positional relation between the toner image on the drum 4 and the paper 11 is deviated.

However, the position of the toner image on the drum 4, the position of the front edge of the paper 11, and the like, that is, the relative positional relation between the toner image on the drum 4 and the paper 11 cannot help fluctuating within a predetermined range due to errors of the attaching positions of various parts constructing the apparatus and errors of the generating timings of control signals which are caused due to an error of a reference clock frequency.

Therefore, when an image signal from the host computer is intended to be fully recorded onto the whole paper, the toner corresponding to the peripheral edge portion of the paper of the toner image on the drum 4 is not transferred but remains on the drum 4. Therefore, the untransferred toner is dispersed into the apparatus and the primary charger 5, copy transfer charger 15, separating charger 16, and the like are polluted. Thus, when the apparatus is used for a long time, there occurs a problem on quality such as image variation, stripe, or the like.

On the other hand, there is also a case where the copy transfer paper is hard to be separated from the drum and the paper jam occurs.

To prevent such problems, in general, for the image signal from the host computer, the signal corresponding to the presumed peripheral edge portion of the paper is forcedly cut on the LBP side and a blank is formed.

FIG. 17 shows an example of a timing chart to form a blank in the conventional apparatus.

A front edge signal of the image signal which is given from the host computer is transferred to the laser beam emitting device 2 through the laser driving circuit 1 after an elapse of $\tau_0$ seconds from a laser signal reference such as vertical sync signal VSYNC indicative of the start of one screen, horizontal sync signal HSYNC indicative of the start of one line, or the like. The signal from the front edge signal of the image signal to the back edge signal after an elapse of $\tau_i$ seconds is written onto the drum 4.

As the horizontal sync signal HSYNC, a beam detecting signal BD which is generated when the reference position of the laser beam which is scanned is detected is used.

A blank is formed by cutting the signal by only the amount of $\tau_b$ seconds in response to the front and back edges of the image signal. That is, at the front edge of the image signal, the signal in a range from $\tau_0$ seconds after the laser signal reference to $(\tau_0 + \tau_b)$ seconds is cut. At the back edge, the signal in a range from $(\tau_0 + \tau_i - \tau_b)$ seconds after the laser signal reference to $(\tau_0 + \tau_i)$ seconds is cut.

After an elapse of $\tau_1$ seconds from the laser signal reference, the driving of the registration roller 14 is started so that the front edge of the image signal coincides with the front edge of the paper 11. The value of $\tau_1$ is calculated by the following equation.

$$\tau_1 = \tau_0 + \frac{l_1 - l_0}{v} \text{ (seconds)}$$

where,
- $l_1$ (mm): distance from the laser writing position on the photo sensitive drum 4 to the copy transfer position,
- $l_0$ (mm): distance from the registration roller 14 to the copy transfer position,
- v (mm/sec): peripheral velocity of the drum 4.

FIG. 16 shows an example of $l_0 < l_1$. However, when $l_1 < l_0$, there is a relation of $\tau_1 < \tau_0$. In the formation of the blank in the foregoing conventional example, the front and back edges of the image signal have been cut by only the same length $\tau_b$.

FIG. 18 is a diagram showing a state in which the blanks and image signal formed as mentioned above are shown on presumed paper.

That is, FIG. 18 shows the image signal obtained by synthesizing the image signal given from the host computer and the blank signal forcedly formed on the LBP side by giving the concept of a bit map. Blanks A, B, C, and D are formed in correspondence to the front, back, left, and right edges of the presumed paper, respectively. W denotes a paper width in the main scan direction of the laser beam and L indicates a paper length in the subscan direction of the laser beam or in the rotating direction of the drum 4.

The dimensions of the blanks are set such that A (mm)=B (mm) or C (mm)=D (mm) in correspondence to the blank signal $\tau_b$.

A practical example will now be described hereinbelow. In the example, the blanks having the dimensions of A=B=C=D=2.5 (mm) are formed. Actually, since there is an error of oscillating frequency of the quartz oscillator as a reference of a clock signal on signal control, the values of the blanks have errors. The blank errors are obtained by multiplying a predetermined ratio to the time (distance) ($t_0$ seconds in the case of the front edge A and ($\tau_0+\tau_i-\tau_b$) seconds in the case of the back edge B) from the laser signal reference to each blank signal on the timing chart of FIG. 16. However, in general, since $\tau_0<<\tau_i$ and $\tau_b<<\tau_i$, the error of the blank in the edge portion in which the distance from the laser signal reference is larger increases more.

Table 1 shows an example in the case where the paper size is set to the A4 size (W=210 mm, L=297 mm), the distance between the laser signal reference VSYNC and the front edge of the image is set to 5 mm, the distance between the laser signal reference HSYNC and the left edge of the image is set to 10 mm, the reference blank amount is set to 3.5 mm, and the error of the control signal is set to ±0.2%.

TABLE 1

| | (unit: mm) | | |
|---|---|---|---|
| A | B | C | D |
| Blanks on image signal 3.5 ± 0.1 | 3.5 ± 0.6 | 3.5 ± 0.1 | 3.5 ± 0.5 |

On the other hand, the blank width on the final print is influenced by the factors of errors from the ideal image position (a magnification error which is caused by the optical system when a latent image is formed by the laser, a registration error and oblique movement amount regarding the conveyance of the paper, and the like) and by dimension errors of the paper itself, so that it will be obvious from Table 2 that a side having no blank exists on the paper with a certain probability.

TABLE 2

| | (unit: mm) | | | | | |
|---|---|---|---|---|---|---|
| | Tolerance concerned | | | | Synthesized value of tolerances | Width of blank on print |
| | Magnification | Registration | Oblique Movement | Size of paper | | |
| A | — | 0 ± 2.0 | 0 ± 0.7 | — | 0 ± 2.2 | 3.5 ± 2.3 |
| B | 0 ± 3.0 | 0 ± 2.0 | 0 ± 0.7 | 0 ± 1.0 | 0 ± 3.8 | 3.5 ± 4.4 |
| C | — | 0 ± 2.0 | 0 ± 1.0 | — | 0 ± 2.3 | 3.5 ± 2.4 |
| D | 0 ± 2.1 | 0 ± 2.0 | 0 ± 1.0 | 0 ± 1.0 | 0 ± 3.3 | 3.5 ± 3.8 |

The actual variations of the tolerances have a normal distribution. The overlap of the various tolerances is not given by the simple sum but is given by the square of the sum of the values which are obtained by squaring each tolerance. On the other hand, the reason why the "magnification" and "paper size" of the sides A and C have no tolerance is because those sides are used as reference sides to measure the tolerances. That is, all of the "magnification", "registration", and "oblique movement" in Table 2 are the amounts which are measured by the image on the final print and the specified values are predetermined to limit those amounts. The "magnification" is measured by using the paper edge (left edge C in the example) on the reference side in the main scan direction of the laser beam and the paper edge (edge A in the example) on the reference side in the subscan direction as references. Since the paper is fed on the basis of the front edge A and either the right or left paper edge (left edge C in the example) as references, the errors are accumulated at the paper edges on the opposite sides, respectively. Therefore, in general, the synthesized values of the tolerances at the front edge A and back edge B or at the left edge C and right edge D differ.

However, since the blanks on the image signal are formed such that A=B and C=D, there are the following inconveniences.

(1) In certain paper edge portions (front edge A and left edge C in the example), the signal is cut more than it is needed, thereby narrowing the signal region which can be effectively used.

(2) On the contrary, in the other paper edge portions (back edge B and right edge D in the example), the blanks lack and there occurs a case where the toner image is not transferred but remains onto the photo sensitive drum 4.

In the case of using the LBP as a conventional line printer, in general documents, blanks are frequently formed in the peripheral edge portions of the paper. Therefore, such inconveniences are not so serious. However, in the case of handling image information as in the case of using the LBP as an output printer of an electronic file or image reader, or the like, it is demanded to write information on the whole region of the paper. The signal region which can be effectively used must be widened as large as possible and a consideration must be paid such that no toner image remains on the photo sensitive drum 4. Such considerations lack in the conventional blank formation.

On the other hand, in U.S. patent application No. 779,107 and the like, there has been disclosed an image recording apparatus having the functions to print on both sides of a copy transfer paper and to print on a single side of a copy transfer paper a plurality of times. In such an apparatus, the running accuracies of the papers differ in the printing operations of the first and second surfaces due to the difference of the paths of the paper or the like. Therefore, there is a case such that although blanks are formed on the first surface, no blank is formed on the second surface, so that the image is deviated out of the paper.

Particularly, in the case of transferring by using the copy transfer roller, there is a drawback such that the toner remaining on the drum without being transferred is deposited onto the copy transfer roller, so that the back surface of the next copy transfer paper becomes dirty or the like.

SUMMARY OF THE INVENTION

It is an object of the present invention to eliminate the foregoing drawbacks and to provide an improved image recording apparatus.

Another object of the invention is to provide an image recording apparatus in which even if errors within a range of each tolerance occur, the deviation of the image out of a copy transfer paper is not caused and the effective usable region to form an image can be obtained as large as possible.

Still another object of the invention is to provide an image recording apparatus in which a range of errors of the blank amount can be made constant irrespective of the size of image, thereby enabling an effective usable region for image formation to be widened.

Further another object of the invention is to provide an image recording apparatus which can prevent that the toner which is not transferred onto a photo sensitive material remains due to the occurrence of tolerances regarding a copy transfer paper and the inside of the apparatus becomes dirty.

Further another object of the invention is to provide an image recording apparatus in which even in the two-sided recording mode and the multi-recording mode, the deviation of an image out of a copy transfer paper can be prevented and, at the same time, an effective usable region for image formation can be widened.

The above and other objects and features of the present invention will become apparent from the following detailed description and the appended claims with reference to the accompanying drawings.

BRIEF DESCRIPTION OF THE DRAWINGS

FIG. 18 is a schematic explanatory diagram of blanks on a bit map.

DETAILED DESCRIPTION OF THE PREFERRED EMBODIMENTS

As embodiment of the present invention will be described hereinbelow with reference to the drawings.

(Embodiment 1)

Figure 1:
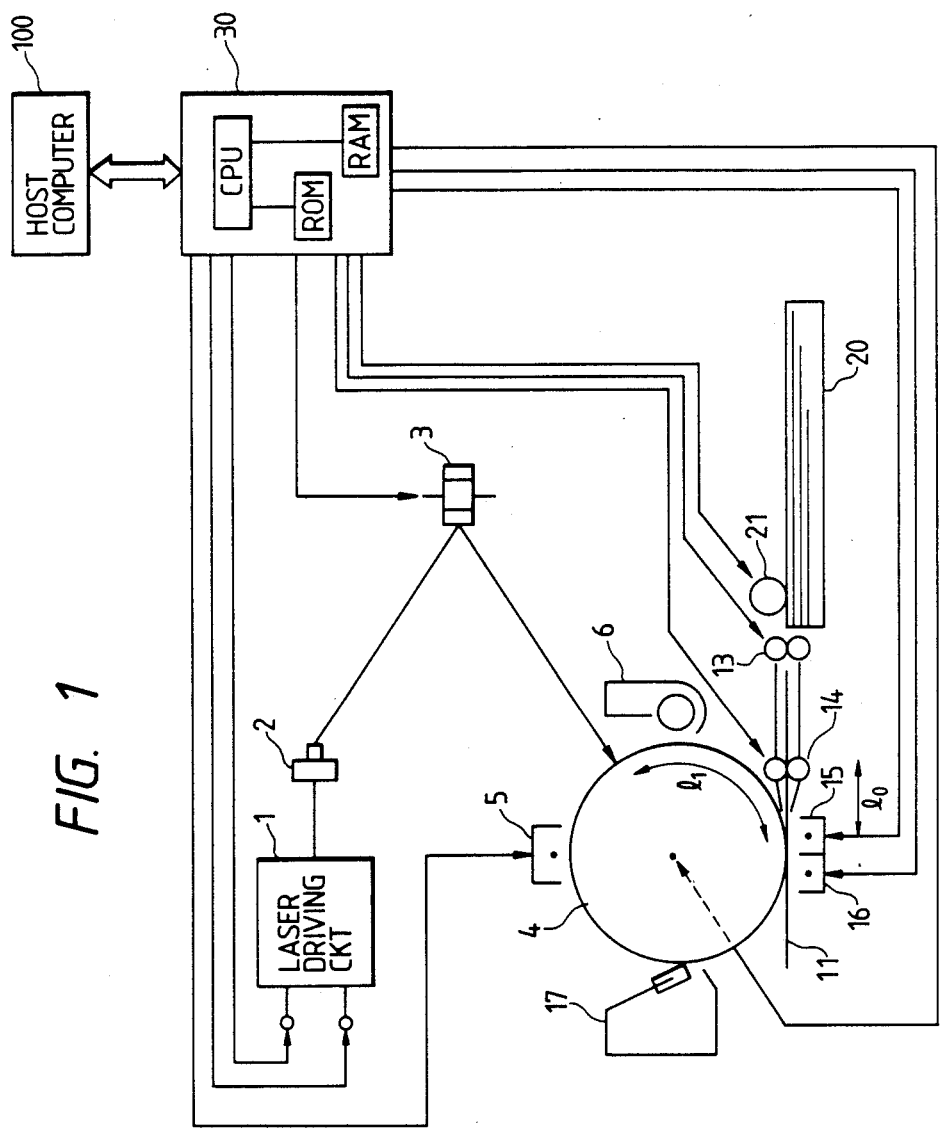
FIG. 1 is a schematic diagram showing the first embodiment of the present invention.
Figure 16:
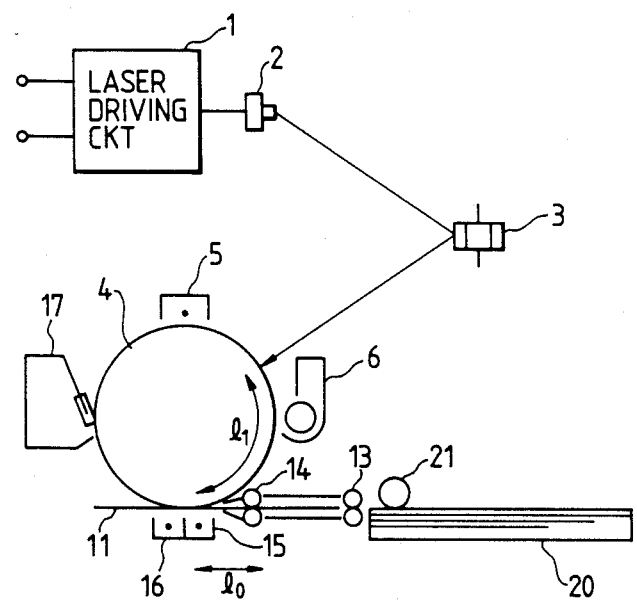
FIG. 16 is a schematic diagram of a conventional apparatus.
Figure 17:
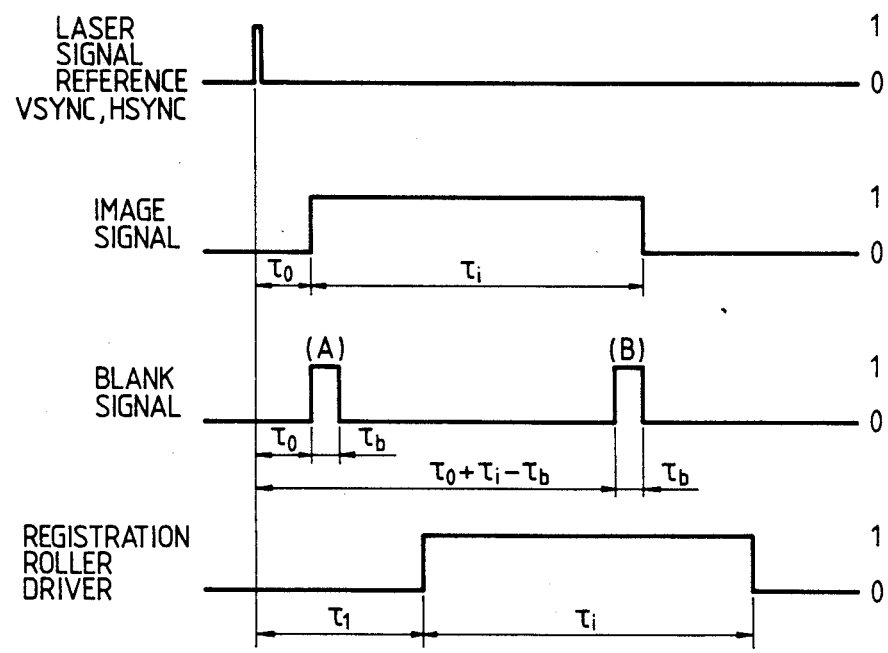
FIG. 17 is a timing chart for the conventional apparatus.

FIG. 1 is a schematic diagram showing the first embodiment of the invention in the case where the invention is applied to the foregoing laser beam printer (LBP). Therefore, in the following description, the same portions and meanings as those shown in FIGS. 16 and 17 are designated by the same reference numerals and characters.

The laser driving circuit 1, polygonal mirror 3, photo sensitive drum 4, primary charger 5, conveying roller 13, registration roller 14, copy transfer charger 15, separating charger 16, and paper feed roller 21 are connected to a host computer 100 and are controlled on the basis of instructions from a controller 30 comprising a microcomputer or the like.

Figure 2:
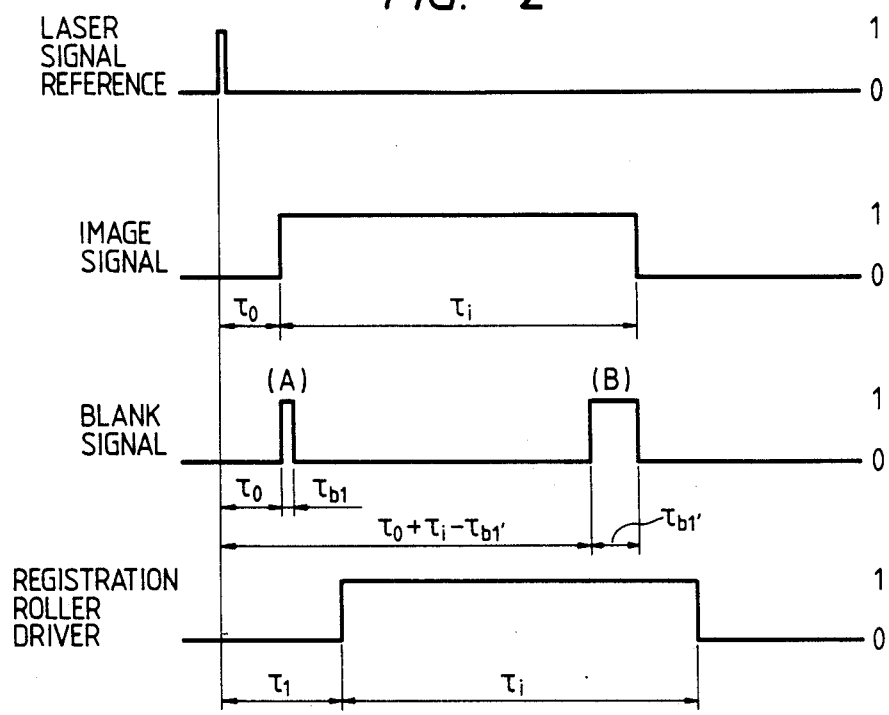
FIG. 2 is a timing chart showing the control of the first embodiment of the invention.

Therefore, the blank formation in the embodiment will now be described with reference to a timing chart shown in FIG. 2.

In the embodiment, a cutting time $\tau_{b1}$ on the image front edge side of the blank signal which is output from the controller 30 to the laser driving circuit 1 is set to be shorter than a cutting time $\tau_{b1}$, on the image back edge side ($\tau_{b1} < \tau_{b1'}$). Such a relation corresponds to A < B in a bit map shown in FIG. 17.

A procedure to determine the lengths $\tau_{b1}$ and $\tau_{b1}'$ of the blank signal will now be described hereinbelow. For convenience of explanation, a method of setting the sizes A, B, C, and D (there is the unconditional relation between these sizes and $\tau_{b1}$. $\tau_{b1}'$) of the blanks on the image signal will be described.

(1) Synthesized values of various tolerances

As already mentioned above, a deviation between the ideal position of the image on the image signal and the printing position on the actual print is obtained by the relative various tolerances specified in accordance with the actual print. The synthesized tolerance values assume $A_1$, $B_1$, $C_1$, and $D_1$ and are referred to as reference tolerance values for convenience of explanation.

Table 3 shows an example of them.

TABLE 3

| | (unit: mm) | | | |
|---|---|---|---|---|
| | $A_1$ | $B_1$ | $C_1$ | $D_1$ |
| Synthesized tolerance values | 2.2 | 3.8 | 2.3 | 3.3 |

(2) Blank width on the image signal

Figure 9:
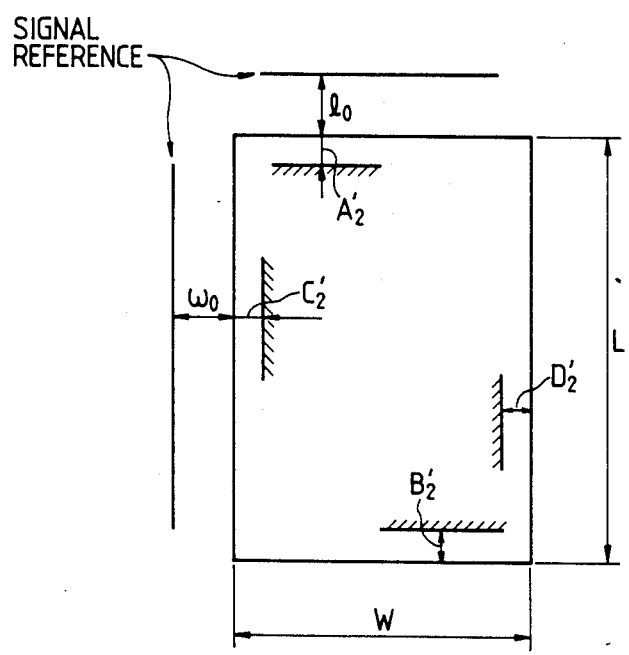
FIG. 9 is a schematic diagram showing the relation between the signal reference and the boundary of blanks.

By considering that a variation occurs in sizes of the blanks due to the crystal oscillation errors (±0.2% in this case), the condition such that even if the blank width becomes minimum, the toner image on the photo sensitive drum 4 is not deviated from the copy transfer paper 11 is given by the following equations α. As shown in FIG. 9, $l_0$ and $w_0$ denote the distances from the laser signal reference to the presumed reference side paper edge portions and correspond to $\tau_0$ in the timing chart of FIG. 2. $A_2'$, $B_2'$, $C_2'$ and $D_2'$ denote ideal values of the blank widths on the image signal.

$$\left. \begin{array}{l} (l_0 + A_2') \times 0.998 \geq l_0 + A_1 \\ (l_0 + L - B_2') \times 1.002 \leq l_0 + L - B_1 \\ (w_0 + C_2') \times 0.998 \geq w_0 + C_1 \\ (w_0 + W - D_2') \times 1.002 \leq w_0 + W - D_1 \end{array} \right\} \quad (\alpha)$$

It is assumed that $l_0=5$ (mm) and $w_0=10$ (mm) in a manner similar to the above. By solving the equations ($\alpha$) for the A4 size (W=210 mm and L=297 mm), the following relations are obtained.

$$\begin{array}{ll} A_2' \geq 2.3 \text{(mm)} & B_2' \geq 4.4 \text{(mm)} \\ C_2' \geq 2.4 \text{(mm)} & D_2' \geq 3.8 \text{(mm)} \end{array} \quad (\beta)$$

By using the values of $A_2'$, $B_2'$, $C_2'$, and $D_2'$ which satisfy the above relations, even if the image position and paper position are deviated within a specified range, a situation such that the toner image is not transferred but remains on the photo sensitive drum 4 does not occur.

On the other hand, it is desirable that the effective region which can be used as an image signal is set to be as large as possible. Such a setting is equivalent to that the minimum values which satisfy the relations ($\beta$) are obtained. The minimum values are set to $A_2$, $B_2$, $C_2$, and $D_2$ and it is desirable that they are set to the ideal values of the blank widths (Table 4).

The tolerance widths are given by $A_2-A_1$ and the like.

TABLE 4

| | (unit: mm) | | | |
|---|---|---|---|---|
| | $A_2$ | $B_2$ | $C_2$ | $D_2$ |
| Blanks on the image signal | 2.3 ± 0.1 | 4.4 ± 0.6 | 2.4 ± 0.1 | 3.8 ± 0.5 |

(3) Blank widths on the print

Blank widths $A_3$, $B_3$, $C_3$, and $D_3$ on the actual print are obtained by adding the synthesized tolerance values to the blank widths $A_2$, $B_2$, $C_2$, and $D_2$ on the image signal (Table 5).

TABLE 5

| | (unit: mm) | | | |
|---|---|---|---|---|
| | $A_3$ | $B_3$ | $C_3$ | $D_3$ |
| Blank widths on the print | 2.3 ± 2.3 | 4.4 ± 4.4 | 2.4 ± 2.4 | 3.8 ± 3.8 |

(2) The blank widths on the image signal are set such that $C_2 < D_2$ with respect to the main scan direction of the laser and that $A_2 < B_2$ with regard to the subscan direction of the laser and the characteristic of the present invention is shown. On the other hand, as compared with the conventional example, the region which can be effectively used on the image signal is widened.

(3) Further, as shown in the blank widths on the print, the blank widths on the actual print are 0 even in the case of the minimum value. Therefore, this means that upon copy transfer, the toner image is not deviated from the copy transfer paper 11. Table 6 shows the comparison with the foregoing conventional example.

TABLE 6

| | (unit: mm) | | |
|---|---|---|---|
| | The region which can be effectively used on the image signal | | Possibility such that the image is deviated from the paper |
| | Main scan direction | Subscan direction | |
| Conventional example | 203 ± 0.6 mm | 290 ± 0.7 | Exists |
| Embodiment | 203.8 ± 0.6 | 290.3 ± 0.7 | No |

The above values are obtained by 210-(C+D) in the conventional example and by 210-($C_2+D_2$) in the embodiment with respect to the main scan direction, while they are obtained by 297-(C+D) in the conventional example and by 297-($C_2+D_2$) in the embodiment with regard to the subscan direction.

When the blanks are formed as in the embodiment, generally, the errors which are caused due to the deviation of the image position due to the conveying performance of the paper or the various tolerances are specified on the basis of the front edge and left edge (or right edge) of the paper on the actual print, so that $A_2 < B_2$ and $C_2 \neq D_2$ ($C_2 < D_2$ in the case of using the left edge as a reference; $C_2 > D_2$ in the case of using the right edge as a reference). The blank design values of the front and back edges on the image signal or the blank design values of the left and right edges on the image signal can be set to the same numerical value within the ranges shown in the relations ($\beta$). However, in such a case, the usable range of the image signal is narrowed than it is needed and is opposite to the spirit of the present invention.

Figure 10A:
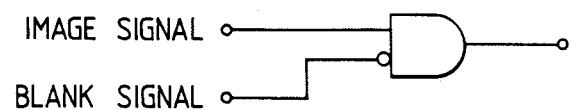
FIG. 10A is a circuit diagram showing the processes of an image signal and a blank signal.
Figure 10B:
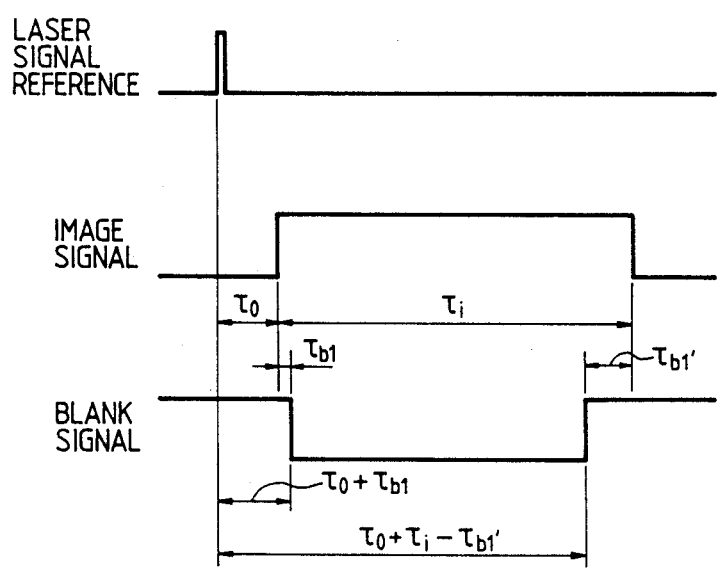
FIG. 10B is a timing chart for the image signal and blank signal.

As shown in FIG. 10A, as the blank widths obtained as mentioned above, the ideal blanks can be obtained by obtaining the logic value of the image signal and the blank signal through a logic gate and by modulating the laser beam by its logic value output. The actual blank signal has a waveform as shown in FIG. 10B and the same shall also apply to the following embodiments.

The timing to generate the blank signal is determined by counting video clocks synchronized with the image signal with respect to the main scan direction, while it is decided by counting drum clocks synchronized with the rotation of the drum with regard to the subscan direction.

(Second embodiment 2)

Figure 3:
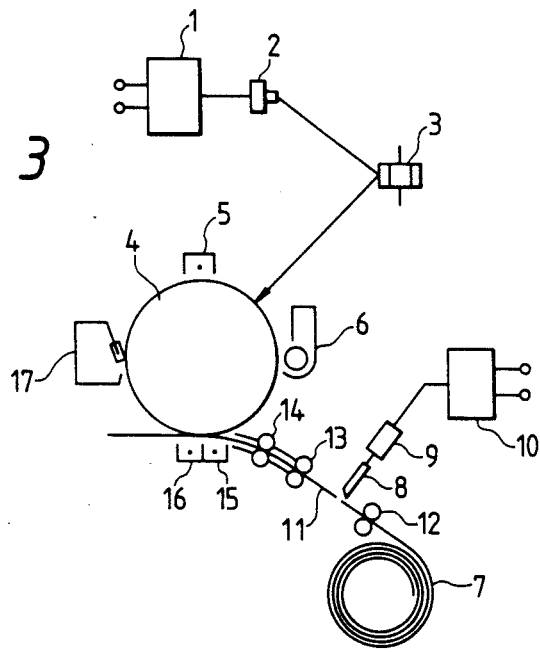
FIG. 3 is a schematic diagram showing the second embodiment of the invention.

FIG. 3 shows the second embodiment of the invention in which the parts and components having the same functions as those shown in the first embodiment are designated by the same reference numerals and their descriptions are omitted.

In the diagram, reference numeral 7 denotes a roll paper; 8 indicates a cutter; 9 an actuator of the cutter 8; 10 an actuator driving circuit; and 12 a paper feed roller which is driven by the controller 30. The second embodiment differs from the first embodiment with respect to a point that the copy transfer paper 11 is not fed from the cassette 20 but is fed out by the paper feed roller 12 from the roll paper 7 and the controller 30 drives the actuator 9 through the cutter driving circuit 10 and the paper 11 is cut by the cutter 8 into the size in accordance with an instruction from the host computer 100. Whether the copy transfer paper has been fed by only the instructed size or not is discriminated by counting the pulses synchronized with the rotation of the driving source of the paper feed roller.

Figure 4:
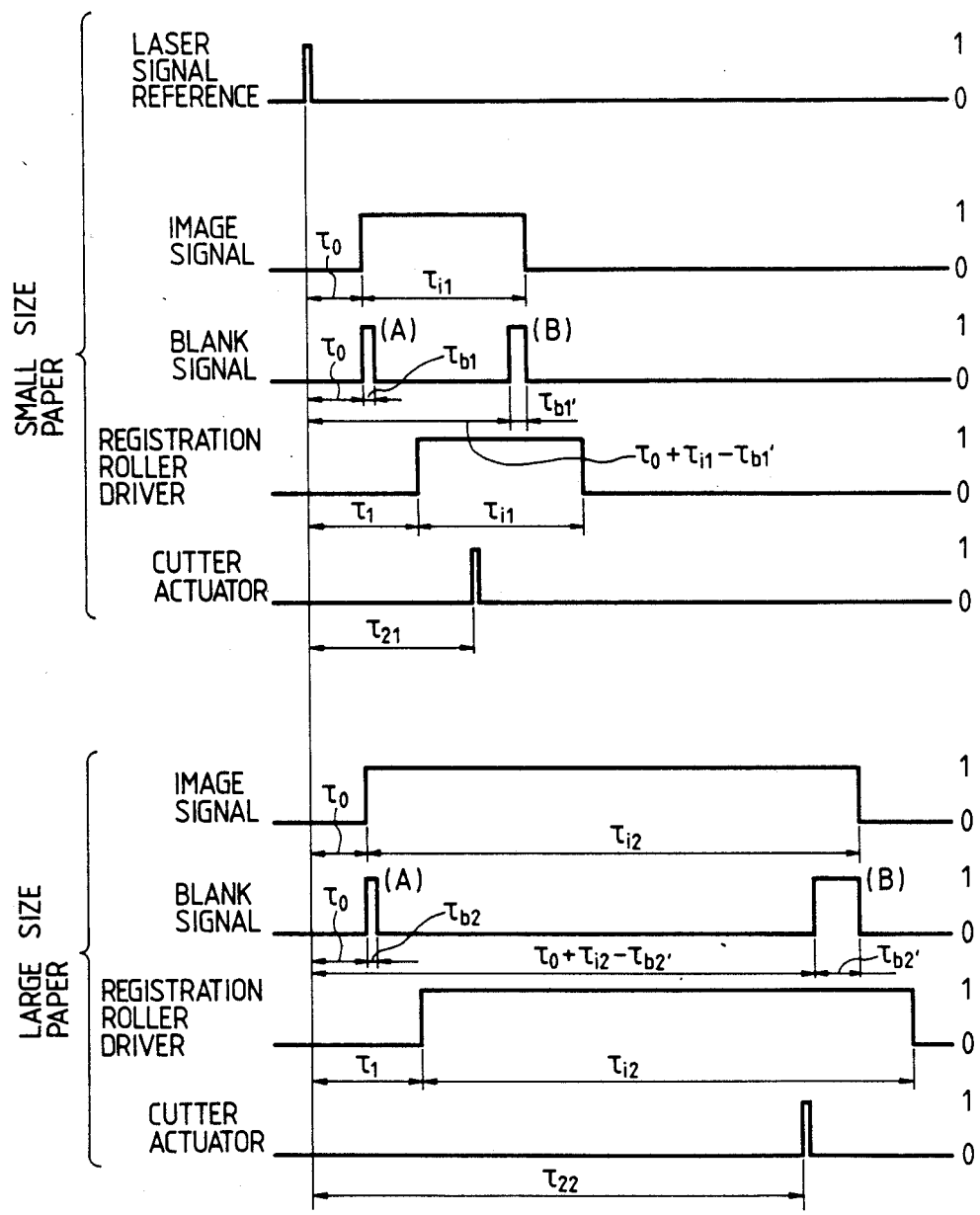
FIG. 4 is a timing chart showing the control of the second embodiment of the invention.

FIG. 4 shows a timing to form the blank signal in the case where the paper sizes indicated by the host computer differ. In the manner similar to the first embodiment, the cutting time $\tau_{b1}$ (or $\tau_{b2}$) on the image front edge side of the blank signal is shorter than the cutting time $\tau_{b1}'$ (or $\tau_{b2}'$) on the image back edge side. However, the sizes ($\tau_{b1}$, $\tau_{b1}'$) of the blanks of the small size paper are set to be smaller than the sizes ($\tau_{b2}$, $\tau_{b2}'$) of the blanks of the large size paper ($\tau_{b1} \leq \tau_{b2}$, $\tau_{b1}' < \tau_{b2}'$: $\tau_{b1}$ is equal to $\tau_{b2}$ when the widths of the papers are the same). Different from the case of feeding a paper from the cassette, the length of the copy transfer paper 11 is determined by making the cutter actuator 9 operative at the time point after an elapse of time $\tau_{21}$ (or $\tau_{22}$) from the laser signal reference in accordance with an instruction from the host computer 100. The timing for generating an operating signal to make the cutter actuator 9 operative needs to be set to a time point which is earlier than the drive end point ($\tau_1 + \tau_{i1}$ or $\tau_1 + \tau_{i2}$) of the registration roller 14. However, its practical time point is decided in accordance with the distance from the copy transfer position of the cutter 8. There is also a case where such a generating timing is set to a time point which is earlier than the drive start time point ($\tau_1$) of the registration roller 14.

An explanation will now be made hereinbelow with respect to practical examples of the values of $\tau_{b1}$, $\tau_{b1}'$, $\tau_2$, and $\tau_{b2}'$ as a subject matter of the embodiment. In the case where the roll paper 7 having the width W=594 mm is used and is copy transferred to the copy transfer papers of the A1 size (L=841 mm) and the A2 size (L=420 mm), the following reference tolerances are obtained from various tolerances as shown in Table 7.

TABLE 7

(unit: mm)

|  |  | Tolerances concerned |  |  |  | Synthesized value of tolerances | Reference tolerance values |
|---|---|---|---|---|---|---|---|
|  |  | Magnification (±1%) | Registration | Oblique movement (±1%) | Size of paper |  |  |
| A 1 size | A | — | 0 ± 2.0 | 0 ± 6.0 | — | 0 ± 6.4 | 6.4 |
|  | B | 0 ± 8.5 | 0 ± 2.0 | 0 ± 6.0 | 0 ± 2.0 | 0 ± 10.8 | 10.8 |
|  | C | — | 0 ± 2.0 | 0 ± 8.5 | — | 0 ± 8.8 | 8.8 |
|  | D | 0 ± 6.0 | 0 ± 2.0 | 0 ± 8.5 | 0 ± 2.0 | 0 ± 10.8 | 10.8 |
| A 2 size | A | — | 0 ± 2.0 | 0 ± 6.0 | — | 0 ± 6.4 | 6.4 |
|  | B | 0 ± 4.2 | 0 ± 2.0 | 0 ± 6.0 | 0 ± 2.0 | 0 ± 7.9 | 7.9 |
|  | C | — | 0 ± 2.0 | 0 ± 4.2 | — | 0 ± 4.7 | 4.7 |
|  | D | 0 ± 6.0 | 0 ± 2.0 | 0 ± 4.2 | 0 ± 2.0 | 0 ± 7.9 | 7.9 |

Table 8 shows the blanks on the image signal which were obtained by considering the quartz oscillation errors (±0.2%) on the basis of the reference tolerance values. (They are calculated by the equations ($\alpha$) by assuming that $l_0 = 5$ mm and $w_0 = 10$ mm.)

TABLE 8

|  |  | (unit: mm) |  |  |  |
|---|---|---|---|---|---|
|  |  | A | B | C | D |
| Blanks on image signals | A1 size | 6.5 ± 0.1 | 12.5 ± 1.7 | 8.9 ± 0.1 | 12.0 ± 1.2 |
|  | A2 size | 6.5 ± 0.1 | 8.8 ± 0.9 | 4.8 ± 0.1 | 9.1 ± 1.2 |

In Table 8, A to D correspond to $A_2$ to $D_2$ in the first embodiment.

In the second embodiment, since the widths W of the A1 and A2 sizes are equal, the value of the front edge blank A is constant irrespective of the length L. However, when the width W changes, the value of the front edge blank A also varies. That is, in general, it is sufficient to set a blank m in the following manner in accordance with error factors $e_i$ mm such as "magnification", "registration", "oblique movement", "paper size", etc. which must form the blanks, a distance $\Delta L$ mm (corresponding to $l_0$ and $w_0$ mentioned above) from the laser signal reference to the reference side paper edge, a paper size L mm (corresponding to L and W mentioned above), and errors (quarts oscillation errors) $\gamma$ on the image signal. (Such a setting process corresponds to the general form of the equations ($\alpha$)).

$$m = \{\sqrt{\Sigma e_i^2} + \gamma(L + \Delta L)\} \pm \gamma(L + \Delta L) \quad (\alpha')$$

$\sqrt{\Sigma e_i^2}$ correspond to $A_1$ to $D_1$ and $\sqrt{\Sigma e_i^2} + \gamma(L + \Delta L)$ correspond to $A_2'$ to $D_2'$. On the other hand, the "magnification" and "oblique movement" correspond to the amounts which depend to the paper size L. Their deviation amounts are indicated by percentages and assume 100.$e_1$(%) and 100.$e_2$(%). On the other hand, the "registration" and "paper size (dimension errors)" correspond to error factors $e_3$ and $e_4$ which are independent on the paper size L. the equations of the blank m for each edge portion of the paper are as follows.

$$A: (\sqrt{(e_2 \cdot L_2)^2 + e_3^2} + \gamma \cdot \Delta L_1) \pm \gamma \cdot \Delta L_1 \quad (\alpha'')$$

$$B: (\sqrt{(e_1 \cdot L_1)^2 + (e_2 \cdot L_2)^2 + e_3^2 + e_4^2} +$$

$$\gamma \cdot (L_1 + \Delta L_1)) \pm \gamma(L_1 + \Delta L_1)$$

$$C: (\sqrt{(e_2 \cdot L_1)^2 + e_3^2} + \gamma \cdot \Delta L_2) \pm \gamma \cdot \Delta L_2$$

$$D: (\sqrt{(e_1 \cdot L_1)^2 + (e_2 \cdot L_1)^2 + e_3^2 + e_4^2} +$$

$$\gamma \cdot (L_2 + \Delta L_2)) \pm \gamma(L_2 + \Delta L_2)$$

$L_1$ denotes a length of line in the progressing direction of the paper; $L_2$ indicates a width of paper; $\Delta L_1$ a distance from the laser signal reference to the front edge of the paper; $\Delta L_2$ a distance from the laser signal reference to the left edge of the paper; $e_3$ and $e_3'$ errors corresponding to the deviations of the registrations in the vertical and lateral directions; and $e_4$ and $e_4'$ dimension errors of the paper size in the vertical and lateral directions, respectively.

The optimum blank width on the image signal is given by the equations ($\alpha''$). However, it will be obvious from the equations ($\alpha''$) that the optimum blank width is not determined by only $e_1$, $e_2$, $e_3$, $e_3'$, $e_4$, $e_4'$, $\gamma$, $\Delta L_1$, and $\Delta L_2$ which are given as constants of the apparatus but the optimum blank width also depends on the paper sizes $L_1$ and $L_2$ which are decided in accordance with instructions from the host computer. That is, by forming the blank signal on the basis of the equations ($\alpha''$) in accordance with the values of $L_1$ and $L_2$ which are given from the host computer, the toner image which is not transferred onto the photo sensitive drum 4 does not remain and the effective usable range on the image signal can be made maximum. (

Embodiment 3)

Figure 5:
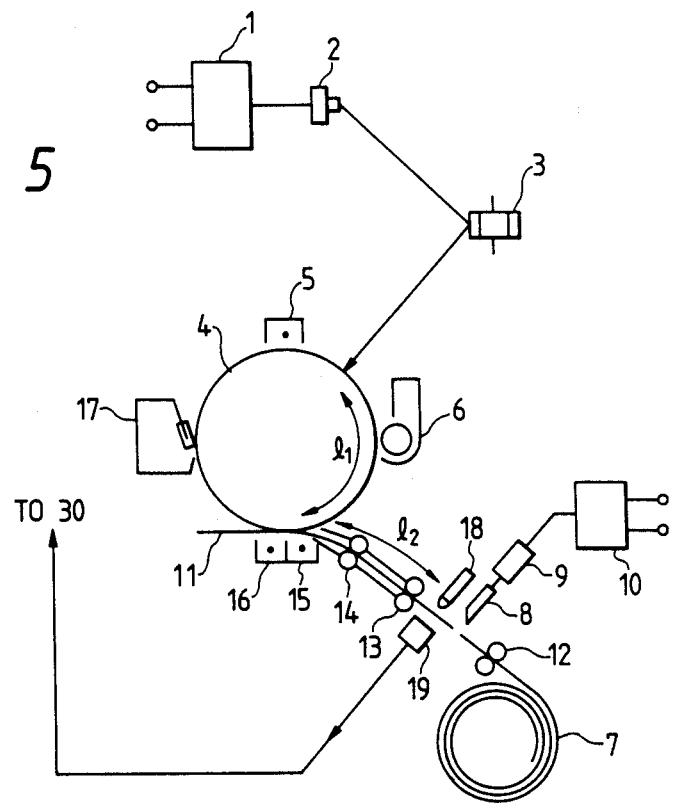
FIG. 5 is a schematic diagram showing the third embodiment of the invention.

FIG. 5 shows the third embodiment of the invention.

The third embodiment is obtained by further adding a lamp 18 and a photodetector 19 constructing paper edge portion detecting means to the second embodiment.

The lamp 18 and photodetector 19 are arranged at the positions of a distance $l_2$ away from the copy transfer position where the copy transfer paper 11 is come into contact with the photosensitive drum 4. The distance $l_2$ is larger than a distance $l_1$ from the position on the drum 4 to which the laser beam is irradiated to the copy transfer position ($l_1 < l_2$) The back edge of the paper 11 is detected by the photodetector 19 through the lamp 18 and is sent as a back edge position signal to the controller 30.

Figure 6:
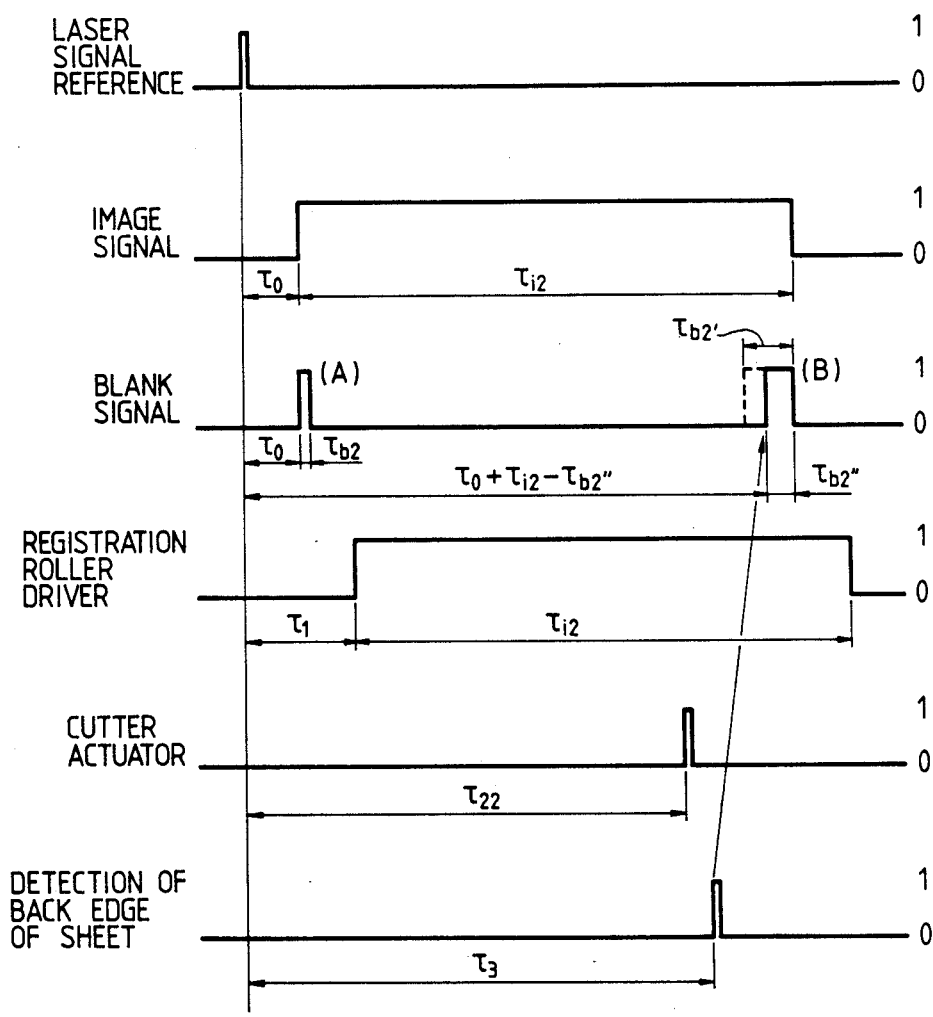
FIG. 6 is a timing chart showing the control of the third embodiment of the invention.

FIG. 6 shows a timing chart of the third embodiment. In the timing chart, a control timing due to the paper back edge detection is added to the timing chart for the paper of a large size shown in FIG. 4. A timing ($\tau_3$) to generate a paper back edge detecting signal is slower than a timing ($\tau_{22}$) to generate a cutter actuator signal and is earlier than a timing ($\tau_0 + \tau_{i2} - \tau_{b2}''$) to generate a back edge blank signal. The back edge blank signal is generated by using the paper back edge detecting signal as a reference signal. Due to this, the distance between the blank signal of the back edge and the reference signal decreases larger than the case in the second embodiment. ($\tau_0 + \tau_{i2} - \tau_{b2}'' - \tau_3$ in the third embodiment $<< \tau_0 + \tau_{i2} - \tau_{b2}'$ in the second embodiment)

That is, in the third embodiment, the influence on the back edge blank width B by the errors $\gamma$ of the image signal can be reduced, so that the value of the back edge blank width B itself can be set to a small value by the amount of such a decrease in influence. In FIG. 6, a broken line in the blank signal indicates the blank signal in the second embodiment ($\tau_{b2}'' < \tau_{b2}'$). If the time from the timing ($\tau_3$) to generate the paper back edge detecting signal to the timing ($\tau_0 + \tau_{i2} - \tau_{b2}''$) to generate the blank signal of the back edge is set to be almost equal to the time ($\tau_0$) from the laser signal reference to the timing to generate the blank signal of the front edge, the tolerances of the back edge blank B are equal to the tolerances of the front edge blank A. The optimum blank size shown in the second embodiment changes as shown in Table 9 with respect to the back edge B.

TABLE 9

| | (unit: mm) | | | |
|---|---|---|---|---|
| | | | Difference between 1 and 2 | |
| | 1 The second embodiment | 2 The third embodiment | Design central value | Max. value of deviation of tolerances |
| A1 size | 12.5 ± 1.7 | 10.9 ± 0.1 | 1.6 | 3.2 |
| A2 size | 8.8 ± 0.9 | 8.0 ± 0.1 | 0.8 | 1.6 |

Figure 11:
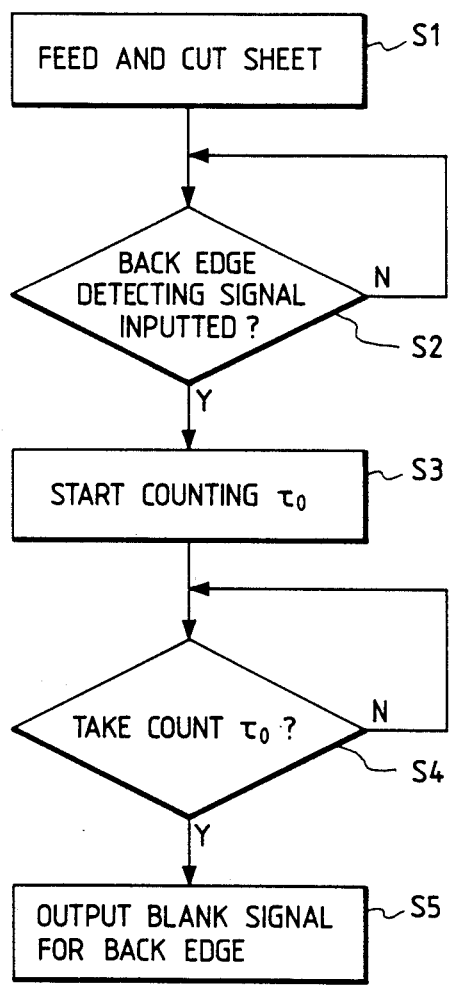
FIG. 11 is a control flowchart in the third embodiment.

FIG. 11 shows processes for forming the blank signal in this case. That is, the controller 30 allows the roll paper to be fed and cut out into the designated size (step S1). When the back edge detecting signal is input to the controller 30 (S2), the counting operation of the time $\tau_0$ is started (S3). When the clocks of the number corresponding to the time $\tau_0$ have been counted (S4), the controller 30 generates the blank signal of the back edge (S5).

In any cases, in the third embodiment, the back edge blank width can be saved and the region into which the image information can be written is widened by the amount of the saved back edge blank width.

In the third embodiment, the general equations ($\alpha''$) are rewritten as follows with respect to the back edge B.

$$B: (\sqrt{(e_1 \cdot L_1)^2 + (e_2 \cdot L_2)^2 + e_3^2 + e_4^2} + \gamma \cdot \Delta L_1') \pm \gamma \cdot \Delta L_1'$$

$\Delta L_1'$ denotes an amount corresponding to the distance ($\tau_0 + \tau_{i2} - \tau_{b2}'' - \tau_3$) between the paper back edge detecting signal and the blank signal of the back edge and is set such that $\Delta L_1' << L_1$. Therefore, the set central value of the back edge B and the tolerance width can be reduced by only the amount of $\gamma \cdot L_1$ than those in the second embodiment. That is, the third embodiment is suitable for the apparatus using the long copy transfer paper 11.

Although the embodiment has been described with respect to the apparatus using the roll paper 7, the invention is not limited to the roll paper 7 but can be also obviously applied to the case of feeding the cut paper from the cassette 20 shown in FIG. 1.

(Embodiment 4)

Figure 7:
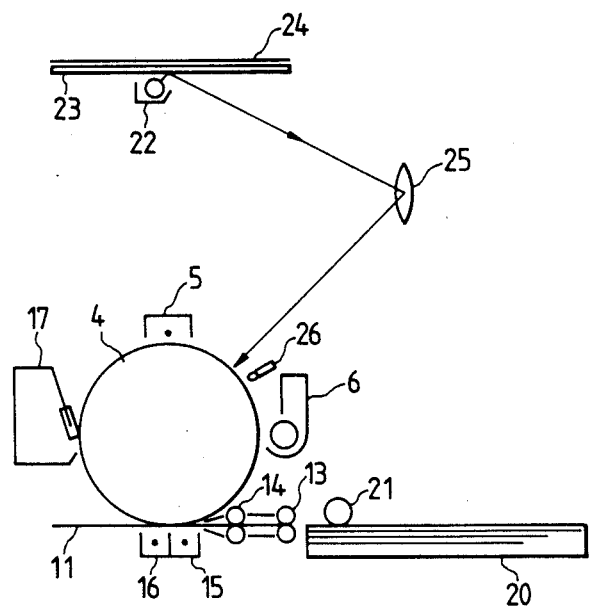
FIG. 7 is a schematic diagram showing the fourth embodiment of the invention.

FIG. 7 shows the fourth embodiment of the invention.

In the diagram, reference numeral 22 denotes an original illuminating lamp; 23 indicates an original placing glass plate; 24 an original; 25 a lens with a reflecting mirror; and 26 an LED array to erase the latent image formed on the drum 4.

Different from the foregoing LBP, in the copying apparatus, the image information of the original 24 illuminated by the lamp 22 is transmitted through the lens 25 and is exposed onto the drum 4, so that a latent image is formed. Blanks are formed by controlling the light-on timing of the LED array 26 arranged between the image exposing position and the position of the developing device 6. Amounts of blanks are determined in a manner similar to the first embodiment. In the case of forming the blanks by the LED array 26, the blank errors at the front and back edges of the image are determined by the clock accuracy to light on the LED and a variation in relative position between the LED array 26 and the drum 4. The blank width errors at the left and right edges are decided by a variation in arrangement of the LEDs of the LED array 26 and a variation in relative position between the LED array 26 and the drum 4. Table 10 shows examples of those error amounts $\Delta A_2$, $\Delta B_2$, $\Delta C_2$, and $\Delta D_2$ obtained with respect to the edge portions of the paper of the A4 size.

TABLE 10

| | (unit: mm) | | | |
|---|---|---|---|---|
| | $\Delta A_2$ | $\Delta B_2$ | $\Delta C_2$ | $\Delta D_2$ |
| LED light-on errors | 0.5 | 2.0 | 1.0 | 1.0 |

It will be understood from Table 10 that the ideal values $A_2'$, $B_2'$, $C_2'$, and $D_2'$ of the blank widths satisfy the following equations. The reference tolerance values $A_1$, $B_1$, $C_1$, and $D_1$ are defined in the same manner as in the first embodiment.

$$\left. \begin{array}{l} A_2' - \Delta A_2 \geq A_1 \\ B_2' - \Delta B_2 \geq B_1 \\ C_2' - \Delta C_2 \geq C_1 \\ D_2' - \Delta D_2 \geq D_1 \end{array} \right\} \quad (\alpha''')$$

When $A_1$, $B_1$, $C_1$, and $D_1$ have the same values as those in the first embodiment, the equations ($\alpha'''$) are modified as follows.

$$A_2' \geq 2.7 \quad B_2' \geq 5.8 \quad C_2' \geq 3.3 \quad D_2' \geq 4.3$$

It is sufficient that the minimum values $A_2$, $B_2$, $C_2$, and $D_2$ in the above ranges are set to the ideal values of the blanks which are formed on the drum 4 (Table 11).

TABLE 11

| | (unit: mm) | | | |
|---|---|---|---|---|
| | $A_2$ | $B_2$ | $C_2$ | $D_2$ |
| Blanks on the photo sensitive drum | 2.7 ± 0.5 | 5.8 ± 2.0 | 3.3 ± 1.0 | 4.3 ± 1.0 |

The blank widths on the copy transfer paper 11 in this case are as shown in Table 12.

TABLE 12

| | (unit: mm) | | | |
|---|---|---|---|---|
| | $A_3$ | $B_3$ | $C_3$ | $D_3$ |
| Blanks on the copy transfer paper | 2.7 ± 2.7 | 5.8 ± 5.8 | 3.3 ± 3.3 | 4.3 ± 4.3 |

By setting the blanks on the drum 4 such that $A < B$ and $C \neq D$ (the ideal values in both cases), the value of the blank at any paper edge cannot become a negative value and the toner image is not deviated from the paper 11 and the inside of the apparatus does not become dirty. The image region on the paper 11 can be made maximum under such conditions.

(Embodiment 5)

Figure 8:
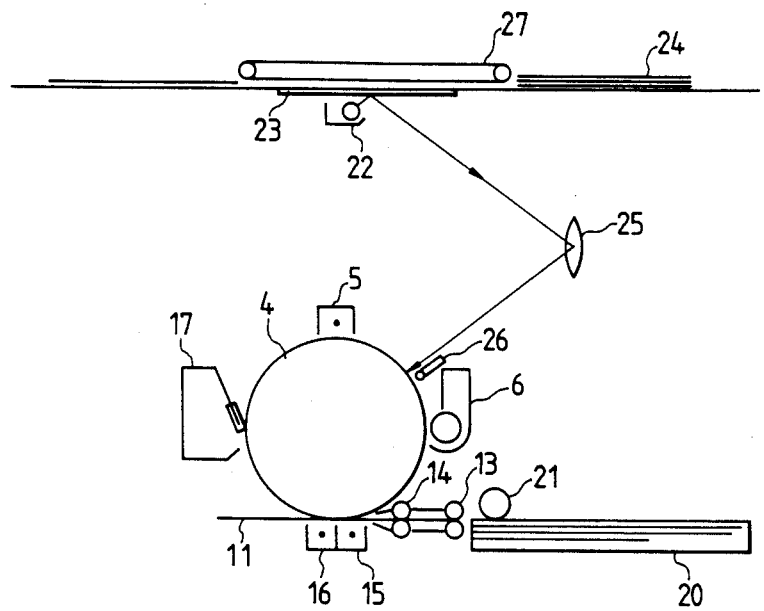
FIG. 8 is a schematic diagram showing the fifth embodiment of the invention.

FIG. 8 shows the fifth embodiment of the invention. The fifth embodiment is obtained by adding an automatic document feeder (hereinafter, referred to as an ADF) 27 to automatically lead the original 24 onto the glass plate 23 to the fourth embodiment.

In the ADF 27, the stop position on the glass plate 23 of the original 24 has an error and there is a case where the peripheral edge portion of the original 24 becomes dirty and is copied onto the paper 11 when the belt of the ADF 27 changes its color or becomes dirty because of the use for a long time. To prevent such a problem, it is desirable to further add the tolerances of the conveying performance of the ADF to the calculation in the fourth embodiment. Table 13 shows examples of the calculations.

TABLE 13

| | (unit: mm) | | | | | | |
|---|---|---|---|---|---|---|---|
| | Tolerances concerned | | | | | | Synthesized value of the tolerances |
| | ADF | | Copying apparatus | | | | |
| | Registration | Oblique movement | Magnification | Registration | Oblique movement | Size of paper | |
| A | 0 ± 2.0 | 0 ± 0.7 | — | 0 ± 2.0 | 0 ± 0.7 | — | 0 ± 3.0 |
| B | 0 ± 2.0 | 0 ± 0.7 | 0 ± 3.0 | 0 ± 2.0 | 0 ± 0.7 | 0 ± 1.0 | 0 ± 4.4 |
| C | 0 ± 1.0 | 0 ± 1.0 | — | 0 ± 2.0 | 0 ± 1.0 | — | 0 ± 2.7 |
| D | 0 ± 1.0 | 0 ± 1.0 | 0 ± 2.1 | 0 ± 2.0 | 0 ± 1.0 | 0 ± 1.0 | 0 ± 3.6 |

Thus, the reference tolerance values, blanks on the photo sensitive drum 4, and blanks on the copy transfer paper are set as shown in Table 14.

TABLE 14

| | (unit: mm) | | | |
|---|---|---|---|---|
| | A | B | C | D |
| Reference tolerance values | 3.0 | 4.4 | 2.7 | 3.6 |
| Blanks on the photo sensitive drum | 3.5 ± 0.5 | 6.4 ± 2.0 | 3.7 ± 1.0 | 4.6 ± 1.0 |
| Blanks on the copy transfer paper | 3.5 ± 3.5 | 6.4 ± 6.4 | 3.7 ± 3.7 | 4.6 ± 4.6 |

By also setting the blanks on the photo sensitive drum such that $A < B$ and $C \neq D$ (the ideal values in both cases), it is prevented that the toner image is deviated from the copy transfer paper 11 (that the blank widths have the minus values) and that the dirt of the belt of the ADF 27 is copied onto the paper. Further, the image region on the paper 11 can be made maximum.

(Embodiment 6)

Figure 12:
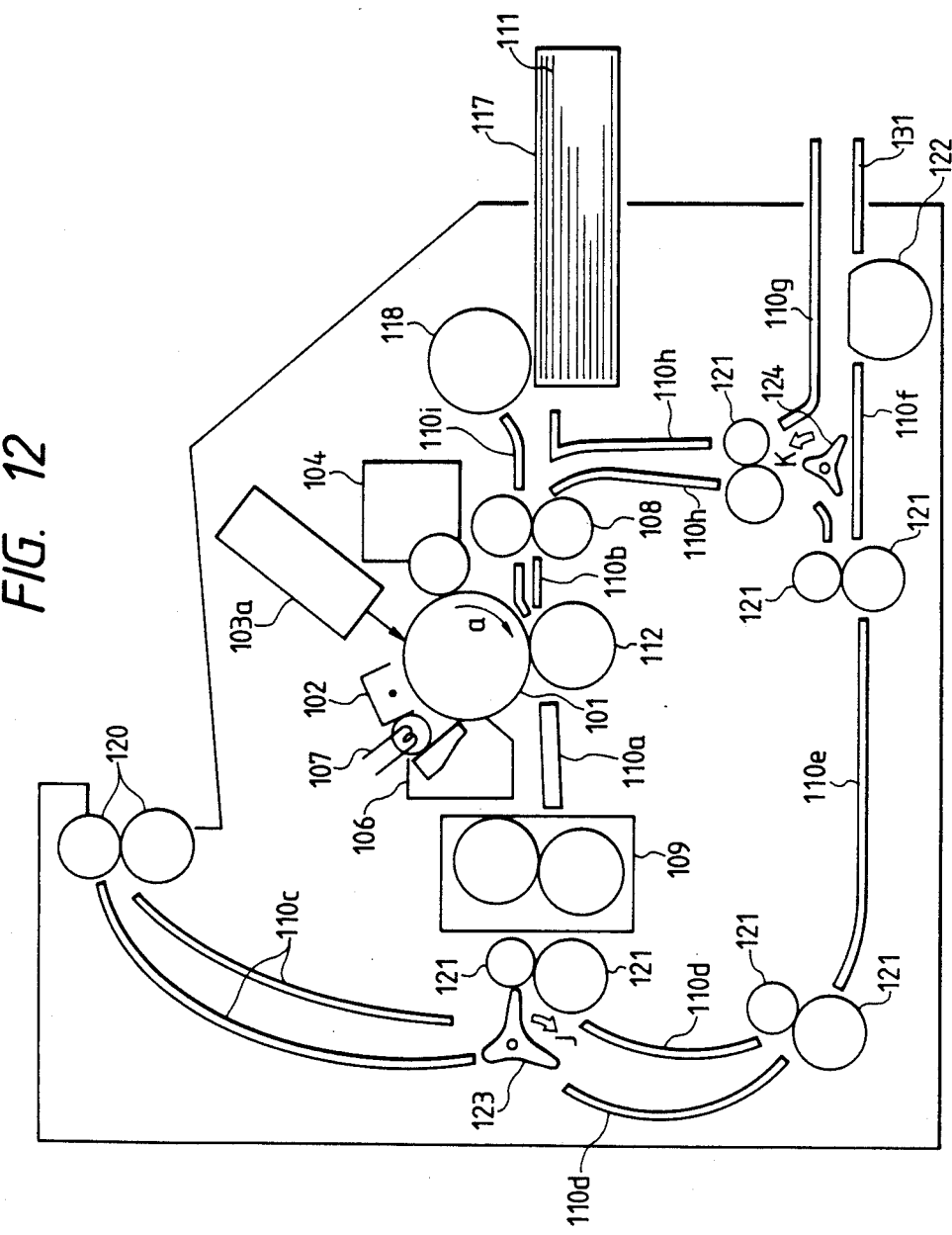
FIG. 12 is a cross sectional view of an image recording apparatus in the sixth embodiment of the invention.

FIG. 12 shows the sixth embodiment of the invention. The sixth embodiment relates to an image recording apparatus having the two-sided mode to record images onto both sides of a copy transfer material and the multi-mode to record an image onto one side of a copy transfer material by overlaying the image a plurality of times.

In FIG. 12, reference numeral 101 denotes a drum; 102 indicates a primary charger; 103a a laser exposing light source; 104 a developing device; 106 a cleaner; 107 a preexposing light source; 108 a registration roller; 109 a fixing device; 110a to 110i conveying guides; 111 a copy transfer material; 112 a copy transfer roller; 118 a paper feed roller; 117 a paper feed cassette; 120 a paper ejecting roller; 121 a conveying roller; 122 a roller to again feed the copy transfer material onto which the recording of the first surface was finished in the two-sided recording mode; and 131 an enclosing portion to enclose the copy transfer material onto which the recording of the first surface was finished in the two-sided mode.

Reference numeral 123 denotes a flapper to switch between the single-sided recording mode and the two-sided recording mode or the multi-recording mode and 124 indicates a flapper to switch between the two-sided mode and the multi-mode.

The practical operation of the apparatus will now be described.

First, the copy transfer material 111 in the paper feed cassette 117 is sent into the apparatus by the paper feed roller 118, the conveying timing is adjusted by the registration roller 108, and the copy transfer material 111 is conveyed at a constant speed.

The cleaning, preexposure, primary charging, exposure, and development are executed onto the drum 101 by the well-known electrophotographic processes, so that a toner image is formed onto the drum 101. The toner image is copy transferred onto the copy transfer material 111 by the drum 101 and the nip portion of the copy transfer roller 112. The sixth embodiment shows an example of the inversion development using the toner of the same polarity as that of the primary charging. Next, the toner image passes through the fixing device 109 and is fixed onto the copy transfer material 111. In the case of the single-sided recording mode, the flapper 123 rotates in the direction of an arrow J and the material 111 is conveyed to the paper ejecting roller 120 along the conveying guide 110c by the conveying roller 121 and is ejected out of the apparatus.

In the case of the two-sided or multi-mode, the material 111 is conveyed in the direction of the conveying guide 110d by the flapper 123. The material 111 is sent to the guide 110g in the two-sided mode and is sent to the guide 110h in the multi-mode by the flapper 124.

In the two-sided mode, the copy transfer material is conveyed until it completely passes through the flapper 124. The material then stops at a position over the enclosing portion 131 and is conveyed in the opposite direction by the paper feed roller 122. However, the moving direction of the material is changed to the direction of the conveying guide 110h by the flapper 124. In any of the two-sided mode and the multi-mode, the material is again led to the registration roller 108 and is fed again.

Figure 13A:
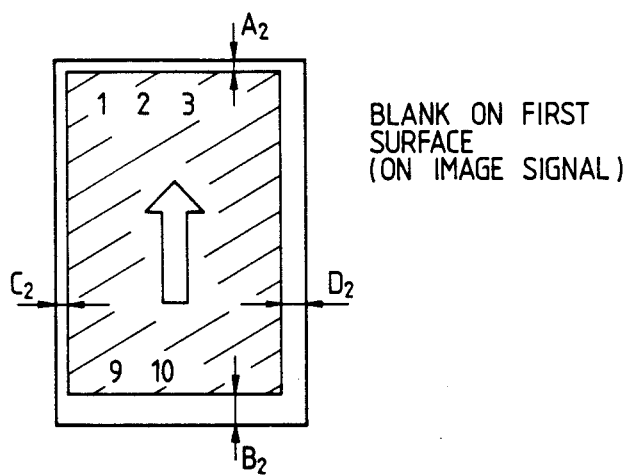
FIGS. 13A and 13B are diagrams showing a blank state in the sixth embodiment of the invention.

FIG. 13 shows a state of the blank formation on the image signal on the first surface in the two-sided mode or multi-mode. A large arrow indicates the conveying direction of the copy transfer material 111. The blanks $A_2$, $B_2$, $C_2$, and $D_2$ on the image signal are formed at the peripheral edges of the presumed copy transfer paper 111 (that is, the copy transfer paper 111 drawn on a bit map) and their values are specified by the size accuracy of the copy transfer paper 111, running accuracy of the paper 111 in the apparatus, and errors of the image signal as mentioned above. Table 15 shows the values of the blanks $A_2$, $B_2$, $C_2$, and $D_2$ obtained in a manner similar to the first embodiment. The numerical values shown in Table 15 are based on the copy transfer paper of the A4 size.

First, the reference tolerance values $A_1$, $B_1$, $C_1$, and $D_1$ are obtained as follows by synthesizing the various tolerances.

TABLE 15

(unit: mm)

| | Tolerances concerned | | | | Synthesized value of the tolerances | Reference tolerance values |
|---|---|---|---|---|---|---|
| | Magnification | Registration | Oblique movement | Size of the paper | | |
| $A_1$ | — | 0 ± 2.0 | 0 ± 0.7 | — | 0 ± 2.2 | 2.2 |
| $B_1$ | 0 ± 3.0 | 0 ± 2.0 | 0 ± 0.7 | 0 ± 1.0 | 0 ± 3.8 | 3.8 |
| $C_1$ | — | 0 ± 2.0 | 0 ± 1.0 | — | 0 ± 2.3 | 2.3 |
| $D_1$ | 0 ± 2.1 | 0 ± 2.0 | 0 ± 1.0 | 0 ± 1.0 | 0 ± 3.3 | 3.3 |

Thus, the blanks $A_2$, $B_2$, $C_2$, and $D_2$ on the image signals are determined as shown in Table 16.

TABLE 16

(unit: mm)

| | $A_2$ | $B_2$ | $C_2$ | $D_2$ |
|---|---|---|---|---|
| Blanks on the image signal | 2.3 ± 0.1 | 4.4 ± 0.6 | 2.4 ± 0.1 | 3.8 ± 0.5 |

The blank values $A_3$, $B_3$, $C_3$, and $D_3$ on the actual print are obtained by adding the reference tolerance values to the tolerances of the blanks on the image signal (Table 17).

TABLE 17

(unit: mm)

| | $A_3$ | $B_3$ | $C_3$ | $D_3$ |
|---|---|---|---|---|
| Blanks on the print | 2.3 ± 2.3 | 4.4 ± 4.4 | 2.4 ± 2.4 | 3.8 ± 3.8 |

That is, the blank values on the print of the first surface do not become the minus values. The developing agent which is not copy transferred but was deviated out of the copy transfer paper 111 does not remain on the photo sensitive drum 101. The copy transfer roller 112 does not become dirty.

Figure 13B:
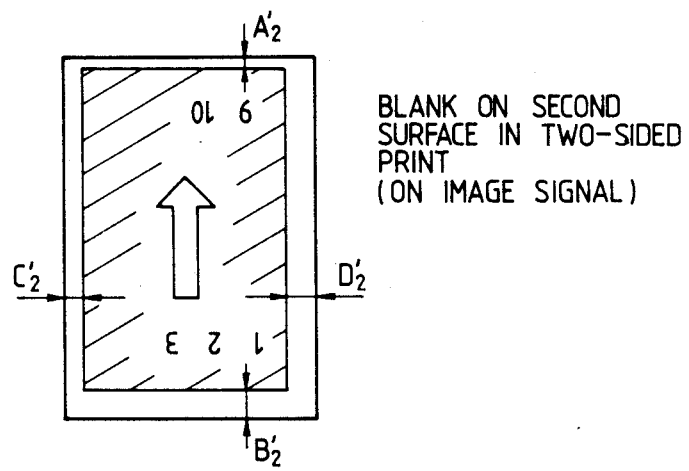

FIG. 13B shows a state of the blank formation on the image signal on the second surface in the two-sided mode. A large arrow indicates the moving direction of the copy transfer paper 111. Different from FIG. 13A, the direction of the image on the second surface is drawn from the back edge portion in the opposite direction. The blanks $A_2'$, $B_2'$, $C_2'$, and $D_2'$ on the image signal are generally set so as to differ from the corresponding values $A_2$, $B_2$, $C_2$, and $D_2$ of the first surface (Table 18). This is because the values of the tolerances concerned in the case of the first surface are different from those in the case of the first surface.

TABLE 18

(unit: mm)

| | Tolerances concerned | | | | Synthesized value of the tolerances | Reference tolerance values |
|---|---|---|---|---|---|---|
| | Magnification | Registration | Oblique movement | Size of the Paper | | |
| $A_1'$ | — | 0 ± 2.0 | 0 ± 1.0 | — | 0 ± 2.3 | 2.3 |
| $B_1'$ | 0 ± 3.0 | 0 ± 2.0 | 0 ± 1.0 | 0 ± 2.0 | 0 ± 4.3 | 4.3 |
| $C_1'$ | — | 0 ± 4.0 | 0 ± 1.3 | — | 0 ± 4.2 | 4.2 |
| $D_1'$ | 0 ± 2.1 | 0 ± 4.0 | 0 ± 1.3 | 0 ± | 0 ± 5.1 | 5.1 |

TABLE 18-continued

| (unit: mm) | | | | | |
|---|---|---|---|---|---|
| Tolerances concerned | | | | Synthesized value of the tolerances | Reference tolerance values |
| Magnification | Registration | Oblique movement | Size of the Paper | | |
| | | | | 2.0 | |

Since the copy transfer paper 111 is fed out of the cassette 117 upon printing of the first surface, the registration in the lateral direction can be relatively easily determined. However, upon printing of the second surface, the copy transfer papers 111 are positioned one by one by a width direction restricting member (not shown) in the enclosing portion 131, so that the accuracy is lower than that in the case of the paper feed from the cassette 117. With respect to the oblique movement, the tolerances increase because of the same reason. On the other hand, since the copy transfer paper 111 onto which the printing of the first surface was finished is heated and pressed by the fixing device 109, its dimension errors increase. The accuracy of the image signal and the like are the same as those in the case of the first surface except a point that the tolerance values differ from those in the recording of the first surface. In a manner similar to the case of the first embodiment, the blanks $A_2'$, $B_2'$, $C_2'$, and $D_2'$ on the image signal are obtained as shown in Table 19.

TABLE 19

| (unit: mm) | | | | |
|---|---|---|---|---|
| | $A_2'$ | $B_2'$ | $C_2'$ | $D_2'$ |
| Blanks on the image signal | 2.4 ± 0.1 | 4.9 ± 0.6 | 4.3 ± 0.1 | 5.6 ± 0.5 |

Thus, the values of the blanks on the actual copy transfer paper of the second surface are as shown in Table 20.

TABLE 20

| (unit: mm) | | | | |
|---|---|---|---|---|
| | $A_3'$ | $B_3'$ | $C_3'$ | $D_3'$ |
| Blanks on the print | 2.4 ± 2.4 | 4.9 ± 4.9 | 4.3 ± 4.3 | 5.6 ± 5.6 |

That is, even in the recording of the second surface, the values of the blanks on the copy transfer paper do not have the minus values. The toner image is not deviated out of the paper 111. The toner does not remain on the drum 101 and does not make the inside of the apparatus dirty.

In correspondence to that the running accuracy and the like of the copy transfer paper 111 upon recording of the second surface differ from those of the first surface, the light emission of the laser light source 103a is controlled in accordance with the first and second surfaces and the values of the blanks are made differ as mentioned above, respectively. Due to this, it is possible to prevent that the toner image is deviated out of the paper 111, while keeping the maximum effective printing region. Therefore, even when the recording is executed in the two-sided or multi-mode, it is possible to prevent that the inside of the apparatus becomes dirty by the toner.

(Embodiment 7)

Figure 14A:
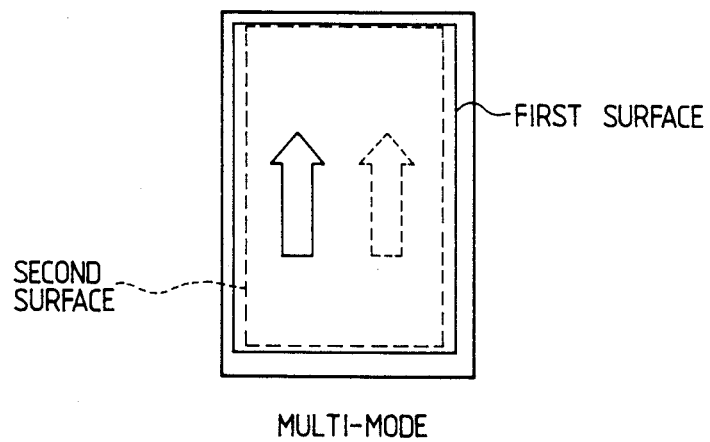
FIGS. 14A and 14B are diagrams showing a blank state in the sixth embodiment of the invention.
Figure 14B:
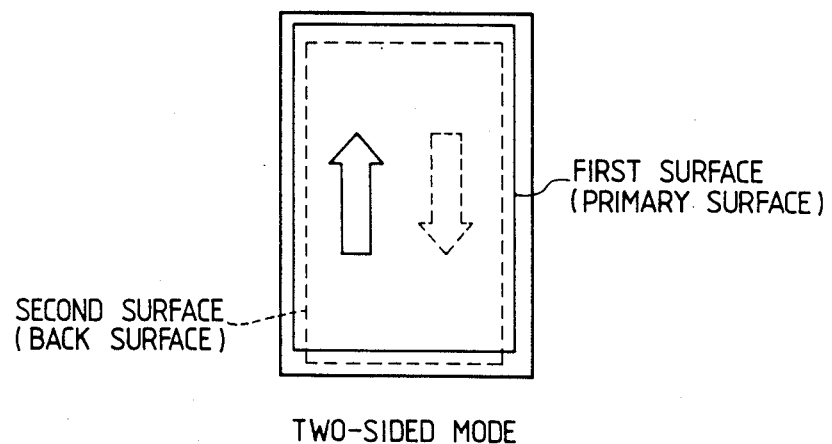

FIG. 14A shows an example of the multi-print in which the first embodiment was executed. FIG. 14B shows an example of the two-sided print in which the first embodiment was executed. In both cases, although the image is not deviated from the copy transfer paper, when the image is fully printed on the whole effective print region on the copy transfer roller 112 or the like, the outer frame of the first surface does not coincide with the outer frame of the second surface. Therefore, in the multi-mode of FIG. 14A, for instance, on the same copy transfer paper surface, the image position of the edge portion on the right side causes a deviation between the images of the first and second surfaces. In the two-sided mode of FIG. 14B, for instance, the positions of the edge portions of the images in the front edge portions on the front and back surfaces of the copy transfer paper do not coincide. When two copy transfer papers are combined as a double spread page, it will be understood that a deviation occurs when seeing the right and left pages.

Figure 15A:
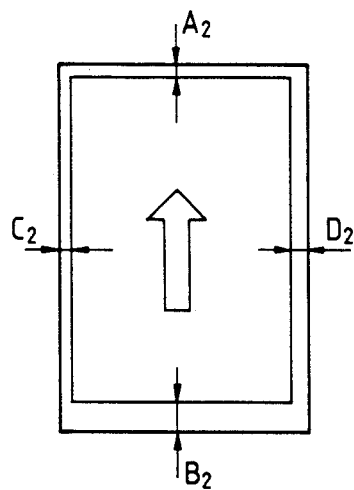
FIGS. 15A to 15C are diagrams showing a blank state in the seventh embodiment of the invention.
Figure 15B:
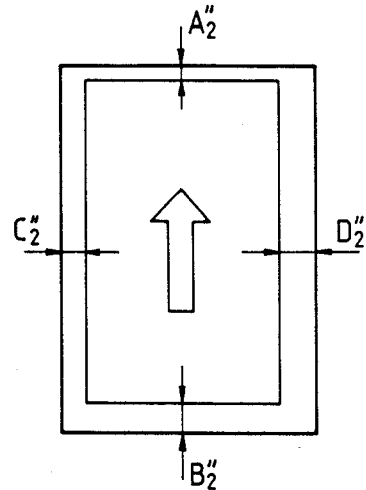
Figure 15C:
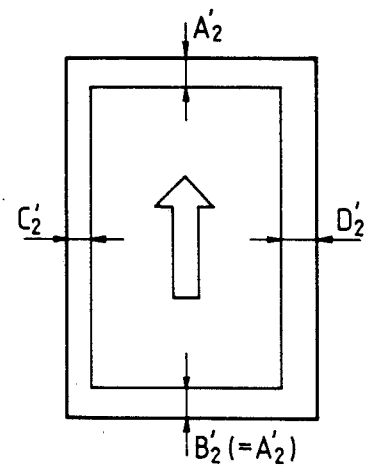

FIGS. 15A to 15C show an embodiment constructed to improve the above inconvenience. FIG. 15A shows a state of the blank formation on the image signal in the single-sided mode; FIG. 15B similarly shows the case in the multi-mode; and FIG. 15C likewise shows the case in the two-sided mode. That is, in the single-sided mode, in a manner similar to the sixth embodiment, it is prevented that the toner image is deviated out of the copy transfer paper 111, and the effective print region is set to be maximum by considering the dimension errors, running accuracy, and the like of the paper 111. However, in the multimode, the larger one of the blank values on the first and second surfaces in the sixth embodiment is used for both of the first and second surfaces and it is prevented that a deviation occurs between the positions of the images on the first and second surfaces by slightly sacrificing the effective recording region. On the other hand, in the two-sided mode, the value of the front edge blank in the conveying direction of the copy transfer paper and the value of the back edge blank are equalized to the maximum one of the blank values on the first and second surfaces, respectively. Thus, when the two copy transfer papers are combined as a double spread page, the deviation between the positions of the right and left images is not caused. In any of the multi-mode and the two-sided mode, the toner is not deviated out of the paper 111 and the inside of the apparatus does not become dirty.

A practical example of the blank formation in the embodiment will now be described hereinbelow on the basis of practical numerical values of the sixth embodiment.

(FIG. 15A)

The values of the blanks on the image signal in the single-mode are set to be identical to those of the first surface in the sixth embodiment (Tables 21 and 22).

TABLE 21

| (unit: mm) | | | | |
|---|---|---|---|---|
| | $A_2$ | $B_2$ | $C_2$ | $D_2$ |
| Blanks on the image signal | 2.3 ± 0.1 | 4.4 ± 0.6 | 2.4 ± 0.1 | 3.8 ± 0.5 |

TABLE 22

(unit: mm)

|  | $A_3$ | $B_3$ | $C_3$ | $D_3$ |
|---|---|---|---|---|
| Blanks on the print | 2.3 ± 2.3 | 4.4 ± 4.4 | 2.4 ± 2.4 | 3.8 ± 3.8 |

(FIG. 15B)

The values of the blanks on the image signal in the multi-mode are set to the values as shown in Table 23 for both of the first and second surfaces.

TABLE 23

(unit: mm)

|  | $A_2''$ | $B_2''$ | $C_2''$ | $D_2''$ |
|---|---|---|---|---|
| Blanks on the image signal | 2.4 ± 0.1 | 4.9 ± 0.6 | 4.3 ± 0.1 | 5.6 ± 0.5 |

The values of the blanks on the print are set to the values as shown in Table 24 in accordance with the first and second surfaces.

TABLE 24

(unit: mm)

| | | $A_3''$ | $B_3''$ | $C_3''$ | $D_3''$ |
|---|---|---|---|---|---|
| Blanks on the print | First surface | 2.4 ± 2.3 | 4.9 ± 4.4 | 4.3 ± 2.4 | 5.6 ± 3.8 |
| | Second surface | 2.4 ± 2.4 | 4.9 ± 4.9 | 4.3 ± 4.3 | 5.6 ± 5.6 |

In any of the cases, the value of the blanks on the print do not have the minus values and the toner image is not deviated out of the copy transfer paper 111. The ideal values of the blanks of the first and second surfaces are the same and the deviation between the positions of the images on the first and second surfaces is eliminated. (FIG. 15C)

The values of the blanks on the image signal in the two-sided mode are set to the values as shown in Table 25 for both of the first and second surfaces.

TABLE 25

(unit: mm)

|  | $A_2'$ | $B_2'$ | $C_2'$ | $D_2'$ |
|---|---|---|---|---|
| Blanks on the image signal | 4.9 ± 0.1 | 4.9 ± 0.6 | 4.3 ± 0.1 | 5.6 ± 0.5 |

Thus, the values of the blanks on the print are set to the values as shown in Table 26 in accordance with the first and second surfaces.

TABLE 26

(unit: mm)

| | | $A_3'$ | $B_3'$ | $C_3'$ | $D_3'$ |
|---|---|---|---|---|---|
| Blanks on the print | First surface | 4.9 ± 2.3 | 4.9 ± 4.4 | 4.3 ± 2.4 | 5.6 ± 3.8 |
| | Second surface | 4.9 ± 2.4 | 4.9 ± 4.9 | 4.3 ± 4.3 | 5.6 ± 5.6 |

Since the ideal values of the blanks $A_2'$ and $B_2'$ and the ideal values of the blanks $A_3'$ and $B_3'$ are the same, respectively, even in the case where the two copy transfer papers are bound in the longitudinal direction as a double spread page, the positions between the upper side (A) and the lower side (B) of the left and right images are not deviated. On the other hand, in the case of binding the two copy transfer papers in the two-sided print in the lateral direction, it is sufficient that the values of the blanks of the left side (C) and the right side (D) are set to the same values.

As mentioned above, by setting the blanks as the same values for the first and second surfaces in the single-mode and the multi-mode or two-sided mode, respectively, the process to switch the blank amounts every page can be omitted and the control becomes easy.

The present invention is not limited to the foregoing embodiments but many modifications and variations are possible within the spirit and scope of the appended claims of the invention.

What is claimed is:

1. An image recording apparatus comprising:
   means for forming an image onto a recording sheet; and
   means for forming blanks in peripheral edge portions of the image which is formed on said recording sheet, wherein said blank forming means includes masking means for masking portions of front and back edges of the image prior to formation of the image onto the recording sheet and wherein a masking amount of the front edge is smaller than that of the back edge.

2. An apparatus according to claim 1, wherein said blank forming means generates a blank signal of a length corresponding to the masking amount.

3. An apparatus according to claim 2, wherein said image forming means has means for inputting image information,
   and said blank forming means converts into a signal of a predetermined density level the image information input by said inputting means by blank signal.

4. An apparatus according to claim 1, wherein said image forming means has means for scanning said recording sheet,
   and said blank forming means sets the masking amount of the image on the scan starting side to be smaller than the masking amount of the image on the scan end side.

5. An image recording apparatus comprising:
   means for forming an image onto a recording medium;
   means for conveying a sheet;
   means for copy transferring the image formed on the recording medium onto the sheet conveyed by said conveying means; and
   means for forming blanks into the portions on the recording medium corresponding to the peripheral edges of the sheet when the image is formed onto the recording medium,
   wherein said blank forming means sets the blank amount on the recording medium corresponding to the front edge in the conveying direction of said sheet to be smaller than the blank amount on the recording medium corresponding to the back edge of the sheet.

6. An apparatus according to claim 5, wherein said image forming means forms the image onto the recording medium in accordance with image information,
   and said blank forming means forms the blanks by gating the image information.

7. An apparatus according to claim 5, further having means for generating size information indicative of the size of said sheet,
   and wherein said blank forming means makes the blank amounts corresponding to said back edge differ in accordance with said size information.

8. An apparatus according to claim 7, wherein said blank forming means increases the blank amount corresponding to said back edge when the size of the sheet is large.

9. An apparatus according to claim 5, further having means for detecting the back edge of the sheet conveyed by said conveying means,
and wherein said blank forming means forms the blank corresponding to the back edge after an elapse of a predetermined time when the back edge of the sheet is detected by said detecting means.

10. An apparatus according to claim 6, wherein said image forming means has means for irradiating the light according to the image information onto said recording medium.

11. An apparatus according to claim 10, wherein said irradiating means scans on the recording medium by the light,
and said blank forming means sets the blank amount corresponding to the edge portion on the scan starting side to be smaller than the blank amount corresponding to the edge portion on the scan end side.

12. An apparatus according to claim 5, wherein said blank forming means determines the blank amounts on the basis of a plurality of tolerances regarding the apparatus.

13. An apparatus according to claim 12, wherein said blank forming means determines the blank amounts on the basis of the tolerances of the conveying means.

14. An apparatus according to claim 12, wherein said blank forming means determines the blank amounts on the basis of the tolerances of the dimensions of the sheet.

15. An apparatus according to claim 12, wherein said blank forming means determines the blank amounts on the basis of the tolerances of the image forming means.

16. An image recording apparatus comprising:
means for forming an image onto a recording medium;
means for conveying a sheet;
means for copy transferring the image formed on the recording medium onto the sheet conveyed by said conveying means;
means for forming the image onto the same sheet a plurality of times; and
means for forming blanks into the portions on the recording medium corresponding to the peripheral edges of the sheet when the image is formed onto the recording medium,
wherein said blank forming means independently makes the blank amounts on the recording medium corresponding to each of the peripheral edges differ when the images are formed onto the same sheet for the first and second times.

17. An apparatus according to claim 16, wherein said image forming means forms the image onto the recording medium in accordance with image information,
and said blank forming means forms the blanks by gating the image information.

18. An apparatus according to claim 16, wherein said blank forming means determines the blank amounts on the basis of a plurality of tolerances regarding the apparatus.

19. An apparatus according to claim 18, wherein said blank forming means determines the blank amounts on the basis of the tolerances of the conveying means.

20. An apparatus according to claim 16, wherein said blank forming means sets the blank amounts upon image formation at the first time to be smaller than the blank amounts upon image formation at the second time.

21. An apparatus according to claim 18, wherein said blank forming means sets the blank amount corresponding to the front edge of the sheet to be smaller than the blank amount corresponding to the back edge.

22. An image recording apparatus comprising:
means for forming an image onto a recording medium;
means for conveying a sheet;
means for copy transferring the image formed on the recording medium onto the sheet conveyed by said conveying means;
means for selectively switching a first mode to form the image once onto the same sheet and a second mode to form the image a plurality of times; and
means for forming blanks in the portions on the recording medium corresponding to the periphery of the sheet when the image is formed onto the recording medium,
wherein said blank forming means independently makes the blank amount on the recording medium corresponding to each peripheral edge differ in the first and second modes, respectively.

23. An apparatus according to claim 22, wherein said image forming means forms the image onto the recording medium in accordance with image information,
and said blank forming means forms the blanks by gating the image information.

24. An apparatus according to claim 22, wherein said blank forming means determines the blank amounts on the basis of a plurality of tolerances regarding the apparatus.

25. An apparatus according to claim 24, wherein said blank forming means determines the blank amounts on the basis of the tolerances of the conveying means.

26. An apparatus according to claim 22, wherein said blank forming means sets the blank amounts in the first mode to be smaller than the blank amounts in the second mode.

27. An apparatus according to claim 22, wherein said blank forming means sets the blank amount corresponding to the front edge of the sheet to be smaller than the blank amount corresponding to the back edge.

* * * * *

UNITED STATES PATENT AND TRADEMARK OFFICE
CERTIFICATE OF CORRECTION

PATENT NO. : 4,972,209
DATED : November 20, 1990
INVENTOR(S) : KOICHI TANIGAWA

Page 1 of 2

It is certified that error appears in the above-identified patent and that said Letters Patent is hereby corrected as shown below:

ON TITLE PAGE:

AT [54] TITLE

"RECORDING" should read --RECORDER--.

AT [30] FOREIGN APPLICATION PRIORITY DATA

"[30]    Foreign Application Priority Data
Feb. 24, 1988 [JP]  Japan.................63-039625"
should be deleted.

COLUMN 1

Line 2, "RECORDING" should read --RECORDER--.

COLUMM 6

Line 27, "$(\tau_{b1}<\tau_{b1},)$." should read --$(\tau_{b1}<\tau_{b1}')$.--.

COLUMN 9

Line 30, " $\tau_2,$ " should read -- $\tau_{b2},$ --.

COLUMN 10

Line 13, "(quarts" should read --(quartz--.

COLUMN 11

Line 18, "(" should be deleted.

Line 20, insert "(" before --Embodiment--.

UNITED STATES PATENT AND TRADEMARK OFFICE
CERTIFICATE OF CORRECTION

PATENT NO. : 4,972,209
DATED : November 20, 1990
INVENTOR(S) : KOICHI TANIGAWA

It is certified that error appears in the above-identified patent and that said Letters Patent is hereby corrected as shown below:

COLUMN 16

Line 54, "first surface" should read --second surface--.

COLUMN 22

Line 17, "claim 18," should read --claim 16,--.
Line 30, "image" should read --images--.

Signed and Sealed this

Thirty-first Day of December, 1991

Attest:

HARRY F. MANBECK, JR.

*Attesting Officer*      *Commissioner of Patents and Trademarks*